United States Patent
Ikonen

(12) 
(10) Patent No.: US 7,003,575 B2
(45) Date of Patent: Feb. 21, 2006

(54) METHOD FOR ASSISTING LOAD BALANCING IN A SERVER CLUSTER BY REROUTING IP TRAFFIC, AND A SERVER CLUSTER AND A CLIENT, OPERATING ACCORDING TO SAME

(75) Inventor: Teemu Ikonen, Espoo (FI)

(73) Assignee: First Hop Oy, Espoo (FI)

( * ) Notice: Subject to any disclaimer, the term of this patent is extended or adjusted under 35 U.S.C. 154(b) by 717 days.

(21) Appl. No.: 09/977,725

(22) Filed: Oct. 15, 2001

(65) Prior Publication Data

US 2003/0074453 A1 Apr. 17, 2003

(51) Int. Cl.
*G06F 9/00* (2006.01)
*G06F 15/16* (2006.01)
(52) U.S. Cl. ...................... 709/228; 709/226
(58) Field of Classification Search ........ 709/238, 709/249, 226–228; 710/20, 36; 711/101, 711/117; 712/28; 714/746; 370/211, 217, 370/221, 230, 235; 718/101, 746
See application file for complete search history.

(56) References Cited

U.S. PATENT DOCUMENTS

| | | | | |
|---|---|---|---|---|
| 6,470,386 B1 * | 10/2002 | Combar et al. | ............ | 709/224 |
| 6,535,509 B1 * | 3/2003 | Amicangioli | ............... | 370/389 |
| 6,578,066 B1 * | 6/2003 | Logan et al. | ............... | 718/105 |
| 6,650,641 B1 * | 11/2003 | Albert et al. | ............... | 370/392 |
| 6,785,704 B1 * | 8/2004 | McCanne | ................... | 718/105 |

* cited by examiner

*Primary Examiner*—William C. Vaughn, Jr.
*Assistant Examiner*—Jude J. Jean-Gilles
(74) *Attorney, Agent, or Firm*—Shalom Wertsberger; Saltamar Innovations

(57) ABSTRACT

An invention enables network traffic rerouting, while avoiding the necessity of traffic to pass via a cluster's master node. By doing so, neither the master node, nor its communication link become a critical failure or load point, thus disrupting the cluster performance. At first a client sends a packet a certain server of the cluster. If the client is redirected, said server adds a redirection header, defined by a new redirection protocol, to the packet, and returns the packet to the client. A service address and a redirection flag are placed in the header. The client receives the packet with the redirection header and connects to the target server whose address is in the header. From then on, the target server handles the client's packet and the whole transmission related to it.

19 Claims, 7 Drawing Sheets

*PRIOR ART*

*PRIOR ART*
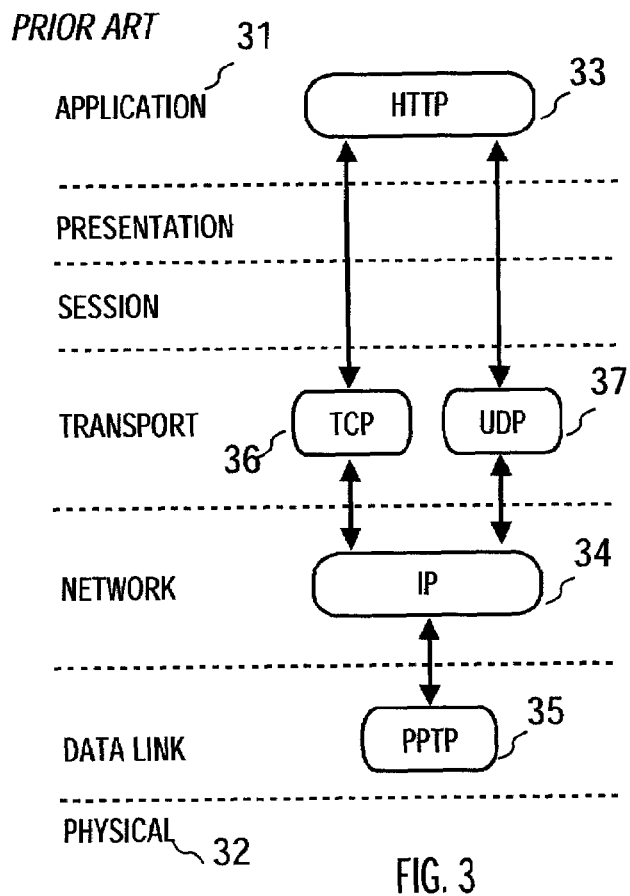
FIG. 3
*PRIOR ART*
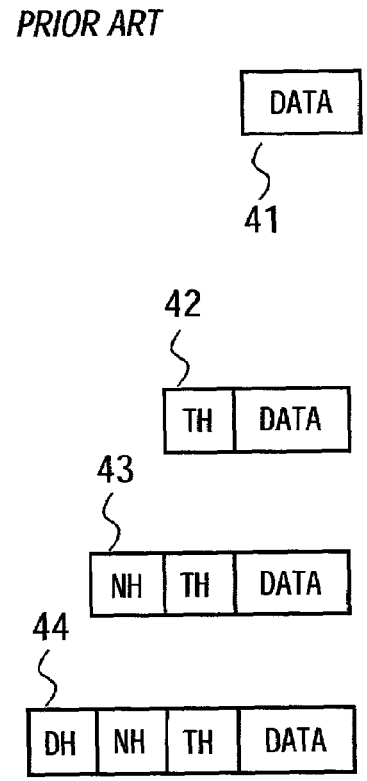
FIG. 4
*PRIOR ART*
FIG. 5
| 0 | 4 | 8 | 16 | 31 |
|---|---|---|---|---|
| VER. | IHL | TYPE OF SERV. | TOTAL LENGHT | |
| IDENTIFICATION | | | FLAGS | FRAGMENT OFFSET |
| TIME TO LIVE | | PROTOCOL | HEADER CHECKSUM | |
| SOURCE ADDRESS | | | | |
| DESTINATION ADDRESS | | | | |
| OPTION + PADDING | | | | |

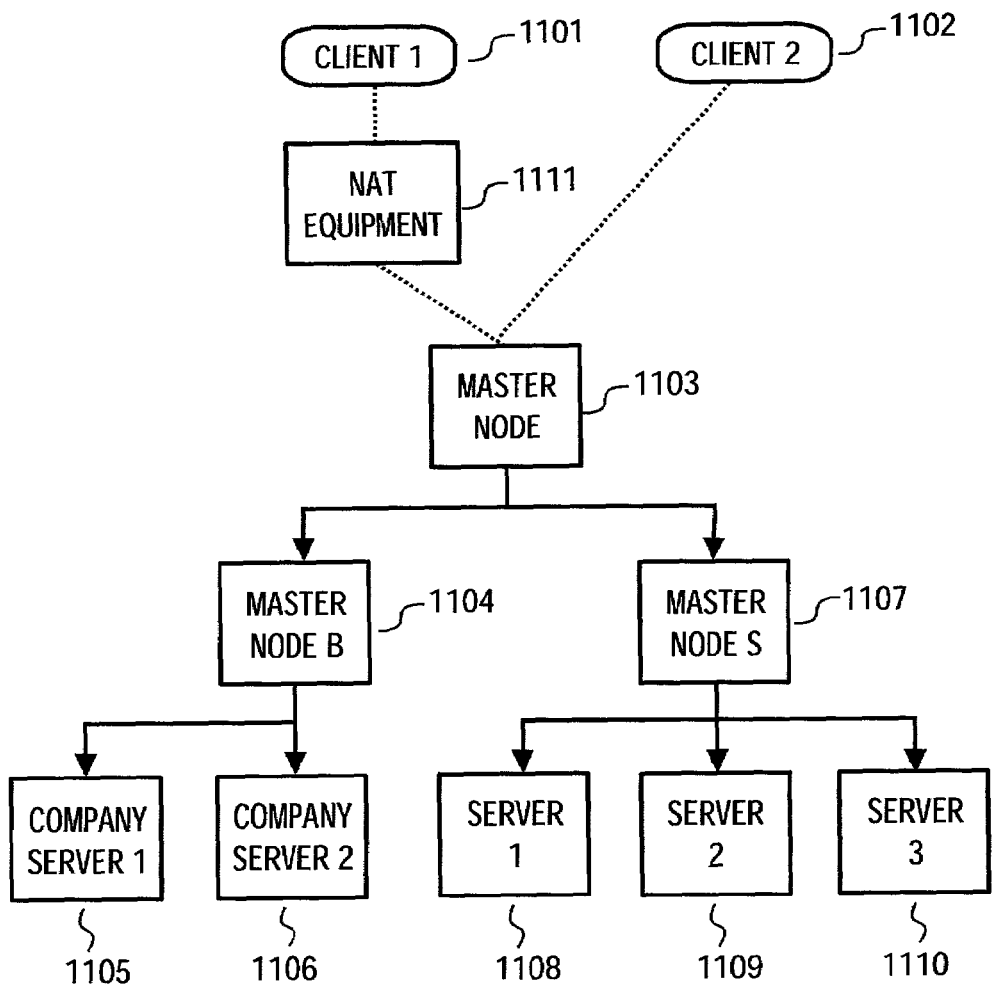

METHOD FOR ASSISTING LOAD BALANCING IN A SERVER CLUSTER BY REROUTING IP TRAFFIC, AND A SERVER CLUSTER AND A CLIENT, OPERATING ACCORDING TO SAME

FIELD OF THE INVENTION

The present invention generally relates to clusters composed of several servers and, if required, rerouting IP transmissions via a certain server.

BACKGROUND OF THE INVENTION

High availability system (HA system) denotes a server system that is always on. Always-on functionality can be acquired by utilizing not only a single server, but a group of servers generally termed a server cluster. The always-on functionality requires that a system is fault-tolerant, redundant, and scalable.

Relating to a server cluster, fault-tolerance means that if one of the servers crashes, the server cluster can still serve its clients. The clients are applications sending requests and communicating with the server cluster. A server may crash, for example, due to a software or hardware failure. Then the other servers of the fault-tolerant server cluster continue to handle the requests which had been initially addressed to the server that crashed.

A server cluster is termed redundant when it includes several servers so that some of them can be in a waiting state during low load. The number of requests correlates with the load of a server cluster. When there are a lot of requests, the server cluster load is usually high. During high load all or most of the servers are in busy state handling the requests.

A server cluster is termed scalable when its architecture is such that one or more servers can be added to the server cluster. The capacity requirements of a server cluster may increase in time, thus it is important that new servers can be added to the server cluster without tedious blackouts.

Load balancing means that the servers of a server cluster can share load with each other. For example, Compaq Tru Cluster© (Compaq Computers, Houston Tex., USA), Sun Full-cluster© (Sun Microsystems, Palo Alto, Calif., USA), and HP-Service guard© (HP, Palo Alto, Calif., USA) are examples of server clusters that include hardware load balancing. Stonebeat© product of Stonesoft Corporation (Helsinki, Finland) achieves the load balancing with software.

Web servers, gateways, and accelerating servers are examples of equipment which are often implemented by a server cluster. A web server operates as the node of the Internet and a gateway transmits data between two networks. The third example may be less known. An accelerating server accelerates network traffic to achieve better network utilization or performance. Sometimes acceleration actions do not increase the number of transmitted bits but they still improve user-experience. For example, reducing the size of transmitted data packets is an acceleration action intended for improving user-experience.

A typical server cluster uses at least one shared disk. The shared disk is needed for the fault-tolerance of the server cluster. If a first server belonging to the server cluster crashes, a second server can read the first server's data from the shared disk and continue the first server's tasks. Commonly, the shared disk is duplicated to ensure the operation of the server cluster if one of the shared disks crashes.

The model of a server cluster can be utilized in various networks, such as the Internet. The Internet was originally composed of fixed, i.e. wired networks, with stationary nodes. During the last decade of the 20$^{th}$ century the number and importance of mobile radio networks increased. At that timeframe radio networks have been incorporated into the Internet. The transmission capacity of radio networks is on average more limited than that of fixed networks, but the transmission capacity is not the only reason why the Internet protocols operate badly under radio networks conditions.

FIG. 1 depicts the Internet traffic in a fixed network and in a radio network. In this example application 1 uses the fixed network and identical application 2 uses the radio network. Both applications send three HTTP requests to the same node X, and concerning the same content. In response to the HTTP requests, both applications receive three transmissions from node X. Both application 1 and 2 and application 2 their first HTTP requests 11 and 12 simultaneously at time T0. Application 1 receives its last response transmission (13) on time T1, and application 2 receives its last response transmission (14) on time T2. The time period between T0 and T2 is about double compared to the between time moments T0 and T1.

FIG. 2 presents an essential reason why the Internet traffic is slower in a radio network than in a fixed network, though the transmission capacities of the said networks should in theory be equal. Time division multiplexing (TDM) is a multiplexing method in which each application is allowed to use a certain number of consecutive time slots (0–4 slots are commonly used) of a certain radio channel in a certain time period. This application will alternatively refer to such group of time slots as 'bursts'. FIG. 2 illustrates transmissions related to one application. The application is allowed to transmit five bursts and the temporal starting points of these bursts are marked with SP1–SP5 respectively. For example, on starting point 1 the application obtains four time slots and on starting point 2 the application obtains two time slots. However, the application can utilize only partly the time slots and the transmission capacity related to them. Because of latency in a radio network, a part of the transmission capacity is wasted. Various reasons, which are known in the art, cause the latency. One reason is that a radio channel cannot be shared between several users as efficiently as a wire used in a fixed network. Another reason is that the Internet protocols are poorly suited for radio networks. More specifically, due to TCP protocol requirements for numerous handshakes between an application and a node before data exchange can occur, significant latency is imposed by the TCP protocol.

FIG. 3 shows a set of Internet protocols and OSI model. OS model is an international standard defined by the ISO (International Standard Organization). The seven layers of OSI are marked in the figure; an application layer (31) is the first one and a physical layer (32) is the seventh one. Hypertext transfer protocol (HTTP) (33) belongs to the application layer, Internet protocol (IP) (34) belongs to a network layer, and Point-to-point tunneling protocol (PPTP) (35) belongs to a data link layer. TCP (36) and User datagram protocol (UDP) (37) are both placed on the transport layer of OSI model. The arrows between protocols (33–37) demonstrate which protocols are needed when an application on the application layer communicate with equipment on the physical layer. For example, HTTP, TCP, IP, and PPTP are a set of protocols enabling the said communication. FIG. 3 depicts only some of the protocols that comprise the Internet protocol suite. It should be noted that TCP/IP does not easily lend itself to precise mapping to the ISO-OSI model. Thus, in these specifications the placement of the various TCP/IP protocols into the OSI model should be construed as loose examples, done more to enhance understanding of the invention rather than in a limiting way. FIG. 4 shows an example of a data packet and its headers. On the application layer the packet includes only data (41). On the transport layer a header TH (42) is added to the packet. On the network layer another header NH (43) is added to encapsulate the packet and the TH header (42). In the data link layer another header DH (44) is added. Then the packet, now containing all the above headers, is sent via the physical layer to its destination. At the destination, the same layers, only in reverse order, remove the corresponding headers, and operate to deliver the original packet to the appropriate application.

We have chosen to use general terms packet and header in this application to encompass the broad terms, such as the word datagram, that is commonly used to describe certain types of packets. It is also common to describe a header as a 'frame' as it encapsulates the data in the packet. As mentioned above, on the application level a packet includes only data. When the packet is handled according to a certain protocol, a header is typically added to it. The header determines how the packet will be handled at the receiver's end, or sometime includes addressing and other information.

FIG. 5 shows the data structure of an IP header (IPv4). The IP header (IPv4) is described in RFC (Request for Comments) 791 published by the Internet Engineering Task Force, at www.ietf.org. The IP header consists of six groups of 32 bits each. The source address (51), the destination address (52), and a field being termed "Option+Padding" (53) are 32-bit long. The other fields comprising the header data structure are shorter. On the sender's end an IP header is added to a packet. Correspondingly, on the receiver's end the IP header is read, and the packet is handled according to Internet protocol and the content of the IP header, after the header is removed. Handling of an IP header means, for example, that a destination address is read from the IP header and the packet is finally sent to the destination address. Since the packets are serially handled by different protocol levels, the collection of protocols are commonly referred as 'protocol stacks'.

The IP header (IPv4) is just one example of headers. RFC 1883 describes another version of the IP header. Thus, each protocol is related to its own type or types of headers. TCP header and UDP header are other important headers relevant to the present invention, and are described in RFC 793 and RFC 768 respectively.

Amongst others fields, TCP headers include fields such as a source port, a destination port, a sequence number, an acknowledgement number, and a window. The source port serves to associate a packet with a sending process and a destination port similarly associates a packet with a receiving process. The sequence number field carries the sequence number of a transmitted packet belonging to a transmission stream. Thus, the packet receiver can detect if some packet is missing from the transmission stream. The acknowledgement field is used to indicate to the sending process that the receiving process indeed received certain packets, and optionally to cause retransmission of packets that arrived corrupted or that that are missing in the sequence. The window field carries the number of octets that the sending process is allowed to transmit before the next acknowledgement.

TCP is a connection-oriented protocol, which means that the protocol acts by establishing a 'virtual connection' between sender and receiver. The virtual connection is said to emulate a direct, wired connection between sender and receiver, and guarantees certain reliable data transfer characteristics. The period in which the virtual connection exists is called a session. The connection is established between the sending and the receiving processes. During the session the sender and receiver update sequence numbers, acknowledgement numbers, and window fields in exchanged packets. Once communication is completed the virtual connection is disconnected. Conversely, UDP is a connectionless protocol, i.e. no virtual connection between the sending application and the receiving Thus, the UDP protocol by itself does not provide a session similar to TCP.

UDP header includes only four fields which are termed a source port, a destination port, a length, and a checksum. The source port indicates a sending application and the destination port a receiving application.

Network Address Translation (NAT) is a common method of mapping address space operating between two communication networks. NAT equipment is any piece of equipment performing NAT functionality. Relating to the present invention, one network is the Internet and the other one may be any communication network, such as Local area network (LAN) or General packet radio services network (GPRS network). NAT equipment can be, for example, a firewall or a node termed Gateway GPRS support node (GGSN). NAT equipment maps the sender of a source network to the receiver of a destination network. The relation between the sender and receiver is termed a mapping. NAT equipment stores these mappings in a mapping table, and by using the mapping table, transfers packets from senders to receivers and vice versa.

FIG. 6 shows an example of a server cluster (601) containing a master node (602) and three slave nodes (603) (604) (605). The figure further includes two clients (606) (607), a communication network (608), the Internet (609), two Internet services (610) (611), and NAT (612). The server cluster operates between NAT and the Internet. The communication between the clients and the Internet services must be performed via the master node 602 and one or more of the three slave nodes.

In the prior art a client sees a server cluster as one entity having one IP address, i.e. Internet protocol address. The client communicates with the master node of the server cluster, for example, by using TCP when the connection can be termed a TCP connection. The TCP connection can be copied from one node to another, for example, by using a shared disk. In the other words, the master node stores the TCP connection data on the shared disk from where the data can be copied to a slave node. In practice, TCP and UDP are the only practical alternatives on the transport layer of OSI model so that either of them must be used in data transmission. UDP includes fewer handshakes than TCP and thus it is more efficient in data transmission. UDP is preferably used when transmitting video and/or audio streams.

In addition to the load balancing of a server cluster, there are other reasons for rerouting traffic. One reason is that a communication link to a certain node may be overloaded and the load of communication links should be balanced. Another possible reason is the desire to reroute traffic to a node advertising certain products. The prior art methods for rerouting traffic suffer from several drawbacks.

Firstly, as all traffic must initially flow to the master node prior to being directed to slave nodes, the master node communication link is open to overload, and is thus a limiting point on the whole cluster performance. Secondly, load balancing, or more generally, rerouting traffic must be performed for each packet of a UDP transmission, because UDP lacks a session feature. As mentioned above, TCP includes the session feature, thus rerouting of TCP traffic is performed only once for each session. Because rerouting of UDP traffic must be performed for each packet, it consumes a lot of processor time. The NAT equipment has a mapping table for mappings. If UDP traffic is rerouted, new mappings are needed, i.e. the size of the mapping table will increase. Each mapping creates one record in the mapping table and consumes one port. Therefore NAT equipment may run out of available ports, disabling the rerouting of traffic.

Thirdly, as UDP is not organized into session, tracking UDP load information is more complicated, and thus load balancing becomes more complex and less efficient.

It should be noted that in these specifications, a server is often referred to as a node, as it s being a node on the network. Thus for example a 'master server' is equivalently referred to as a master node. This distinction also shows that the word 'server' should not be construed to limit the invention to a computer server but also extends to other computing and networking equipment adapted to perform the node's respective function.

SUMMARY OF THE INVENTION

The invention concerns the method for rerouting IP transmissions. IP transmissions are also termed traffic or network traffic. The objectives of the invention relates to the three drawbacks mentioned-above.

The first objective of the invention is to achieve network traffic rerouting, while avoiding the necessity of traffic to pass via a cluster master node. By doing so, neither the master server, nor its communication link become a critical failure or load point, thus disrupting the cluster performance. In addition, cluster nodes can be used more flexibly, because a slave node can operate as a master node, and vice versa. Relating to the invention, a term "server cluster" should be understood widely. It may be a cluster whose nodes are located, for example, in the same room. However, a server cluster may also consist of nodes locating in a large geographical area and being owned by various entities. For convenience and clarity of this description, the nodes are often termed server 1, server 2 etc.

The second objective is to enable rerouting of UDP traffic in efficient way.

The third objective is to improve the load balancing of a server cluster.

The preferred embodiment of the invention requires a new protocol operating in the application, presentation, or session layer of the OSI model, or in their corresponding layers in other networking models. The new protocol is termed "redirection protocol". A redirection means that a client, which has connected to a server of a server cluster, will be redirected to another server of the server cluster. The invention further requires a redirection database. Briefly, the content of the redirection database determines to which server the client will be redirected.

The following provide a non-limiting example of the redirection protocol and the usage of the redirection database.

A client connects to server 1 (1001) by sending a packet. Server 1 receives the packet and requests a service address from the redirection database (1005). The service address consists of an IP address and a port number. The redirection database returns the service address with a redirection flag in response to the request of server 1. Server 1 checks the redirection flag and if it is off, server 1 will continue to handle the client's packet and the whole session or group of packets related to it.

In case that the redirection flag is on, server 1 adds a redirection header, defined by the redirection protocol, to the packet, and returns the packet to the client. The service address and redirection flag are placed in the header. The client receives the packet with the redirection header and connects to the target server who's address is in the header. This server could be, for example, server 2 (1002). From then on, server 2 handles the client's packet and the whole transmission related to it.

To summarize, if a server, which receives the client's packet, is not deemed the appropriate server for handling the packet and transmission related to it, the client obtains the service address of another server, which will handle the transmission.

In another aspect, the invention requires that NAT equipment maintain time information in its mappings By means of this time information it is possible to create an artificial session for a UDP transmission.

In yet another aspect of the present invention is achieved by adding time information to the mappings handled by the server of a server cluster. Such time information allows the creation of an artificial USP 'session'. Using this session, the number of UDP sessions, as well as those of TCP session, may be counted, and thus aim proved indication of load is obtained, to be used for better load balancing.

Thus in one aspect, the invention provides a method for rerouting network traffic, operating in conjunction with a server cluster comprising at least a first and a second server. The method comprises the steps of receiving a packet in a first server, the packet containing indication of a source address; adding a redirection header to the packet, the redirection header including a service address belonging to the second server; and transmitting the packet and redirection header to the source address.

Preferably, the step of obtaining the service address from a redirection database. The source address and the service address are preferably composed of an Internet address and a port. Optionally, the redirection header further comprises a redirection flag indicating whether a client having the source address is expected to perform a redirection to the service address. Optionally, the redirection header further includes a permanent flag indicating whether the client is expected to perform the redirection permanently to the service address or whether the client is expected to perform the redirection once to the service address. In yet another aspect of the invention, the redirection header may further include a leased flag indicating whether the client is expected to perform the redirection to the service address as long as a lease is in force.

The method may also comprise the step of receiving, by a server in the cluster, an indication of redirection failure, and providing a second redirection header to the packet, the redirection header including a service address belonging to an alternative third server.

Optionally, the invention further teaches composing an artificial UDP session related to each record comprising information identifying the sender address, counting periodically artificial UDP sessions resulting in the number of UDP sessions, counting or obtaining TCP sessions resulting in the number of UDP sessions, obtaining the total load of each server of the server cluster as a function of the UDP sessions and TCP sessions.

In another aspect, the invention provides for the steps of: for each server of the server cluster:

Responsive to transmission of a UDP packet, creating and storing a record comprising information identifying the sender address and sender port, and recipient address and recipient port of the UDP packet, and information reflecting the time of transmission.

Responsive to additional transmission of UDP packet from same sender address and port to same recipient address and port, updating said time information to reflect the time of said additional transmission.

Periodically checking for said time information; and,

Removing said record if a predetermined period elapsed from said time of transmission to the time of said checking.

The invention also teaches the options of using the total load of each server when performing the load balancing of the server cluster as well as using the total load of each server when controlling the usage of the communication links used by the server cluster. Thus said redirection database may further collect information regarding load on a selected server set, and wherein said information is used as criteria for selecting second server.

In a broad aspect, the invention is operable with any server, when redirection method comprises receiving a service request in a server, said request having indication of the request sender, selecting a second server for servicing the service request, and sending to said sender, a redirection indication to said second server.

As described above, the method is especially adept at operating in conjunction with a server cluster as taught in those specifications, the cluster having a plurality of member servers, and adapted to reroute network traffic, the cluster comprising:

a redirection database adapted to receive information indicative of a client request, and responsively provide a service address comprising an address of a target server capable of servicing said client request; and, a receiving server adapted to receive said client request and send information indicative thereof to said database;

a transmitting server adapted to send said service address to the client that originating the request.

Preferably, the receiving server and said transmitting server are the same server.

Optionally, the redirection database is integrated in said transmitting server or receiving server or a server combining both.

In a preferred embodiment, the target server is selected according to criteria comprising consideration of server load of a plurality of servers in the cluster. Further preferably, a plurality of said member servers are adapted to act as said receiving server.

A complimentary aspect of the invention describes a redirecting client adapted for network traffic rerouting. Such client can take direct advantage of the method described above and will benefit from a server cluster implementation of the invention. In a preferred embodiment, such client comprises a first module adapted to send a service request to a first server, and a second module to resend the service request to a second server, responsive to receiving a communication packet comprising a redirection header having a service address containing the address of said second server, or an indication thereof.

The client preferably further comprises a module adapted to resend said service request to said first server, responsive to service failure of said second server; Wherein said resent service request contains indication of said service failure.

In yet another preferred embodiment, said second module is farther adapted to direct subsequent communications relating to said service request to said second server. Furthermore, the client may be adapted to send consequent service requests to said second server responsive to indication of doing so embedded within said redirection header.

Preferably, the client's first module is further adapted to indicate a redirecting capacity in said service request. More preferably, this is done in such a way that will be transparent to servers that do not support redirecting, i.e. where said indication of redirecting capacity is indicated in a manner that allows a server lacking redirection capability to service the service request.

BRIEF DESCRIPTION OF THE DRAWINGS

The invention is described more closely with reference to the accompanying drawings, in which

FIG. 3 shows a set of Internet protocols and OSI model;

FIG. 4 shows an example of a data packet and its headers;

FIG. 5 describes the data structure of an IP header;

FIG. 11 shows an example of the hierarchy of a server cluster;

FIG. 12 shows a mapping table intended for NAT equipment;

FIG. 13 shows a mapping table intended for a server of the server cluster;

DETAILED DESCRIPTION OF THE INVENTION

Figure 1:
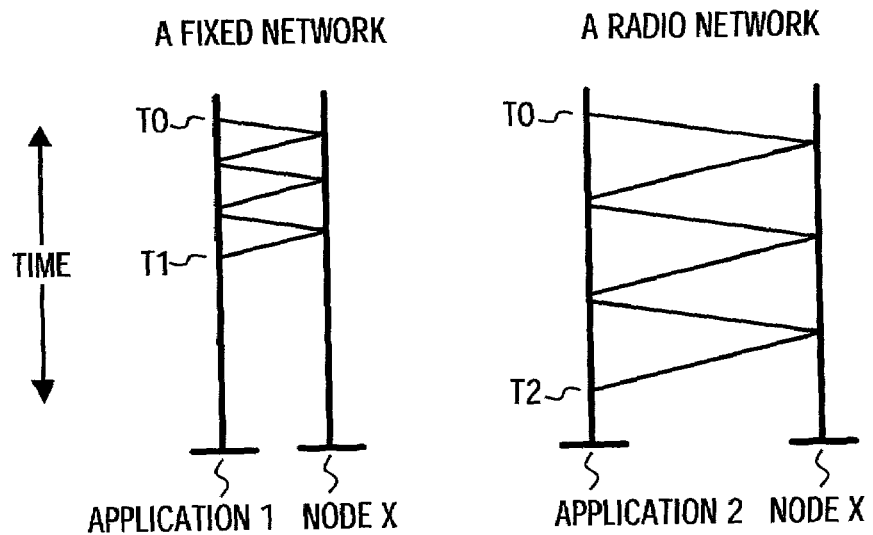
FIG. 1 depicts the network traffic in a fixed network and in a radio network.
Figure 2:
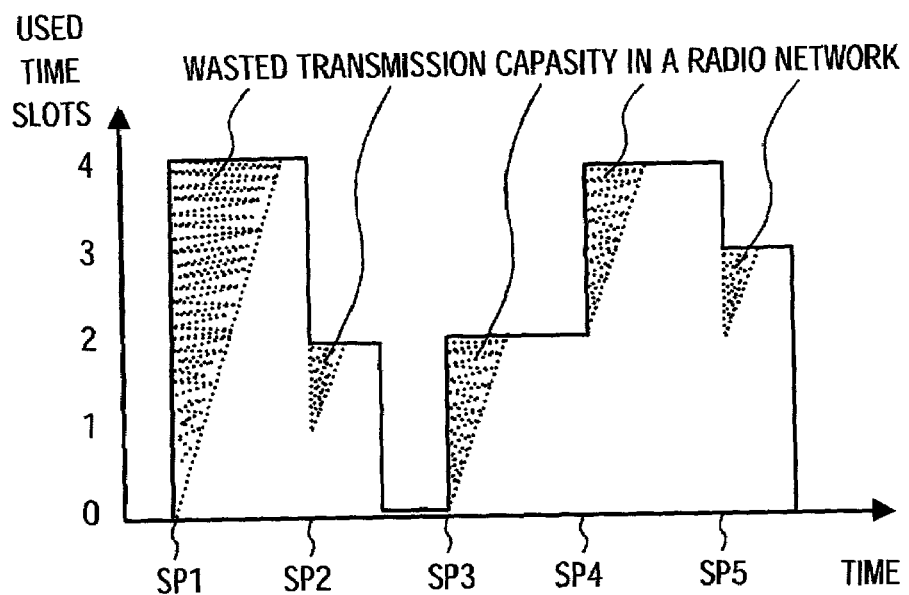
FIG. 2 illustrates wasted transmission capacity in a radio network.
Figure 6:
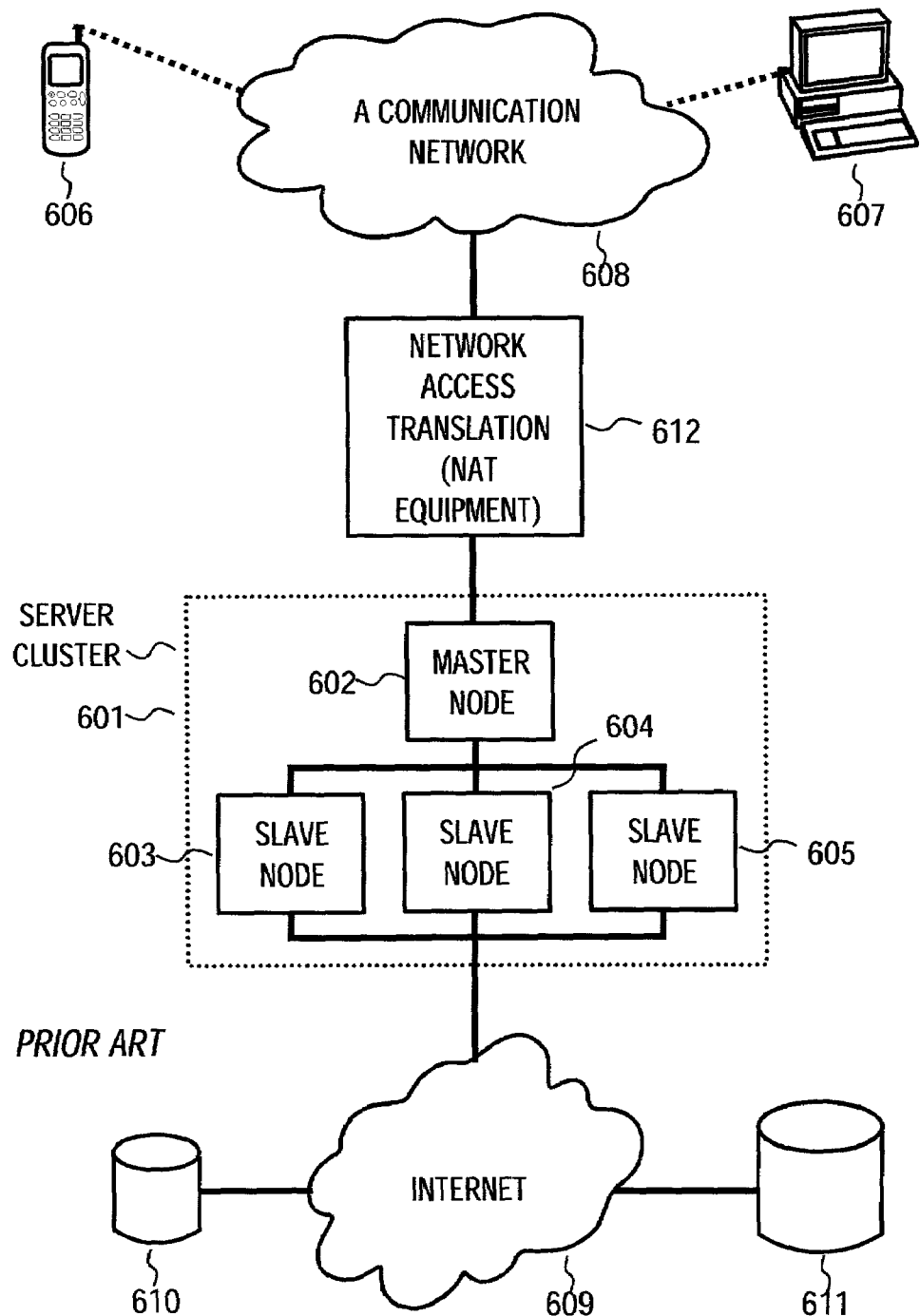
FIG. 6 shows an example of a prior art server cluster.
Figure 7:
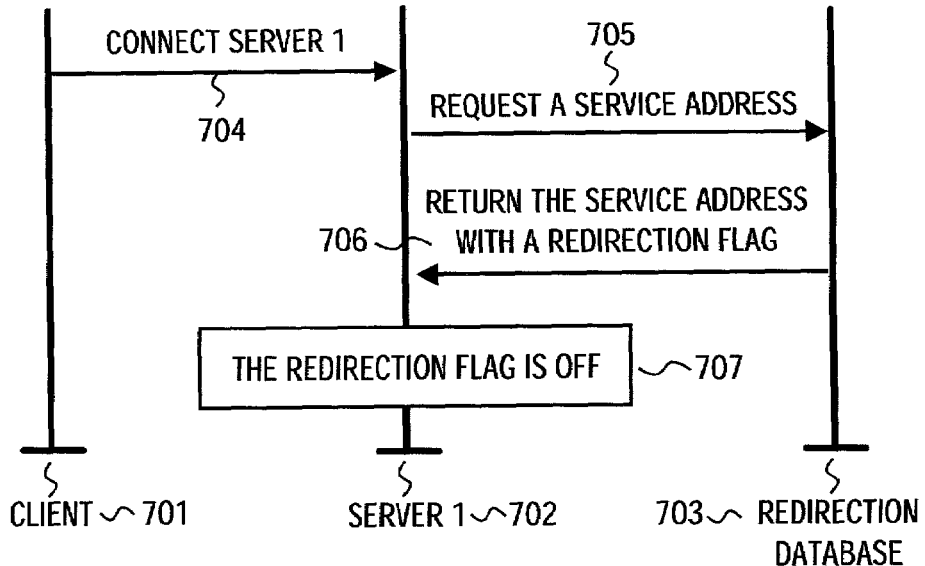
FIG. 7 describes one possible data flow sequence in accordance with one aspect of the inventive server cluster.
Figure 8:
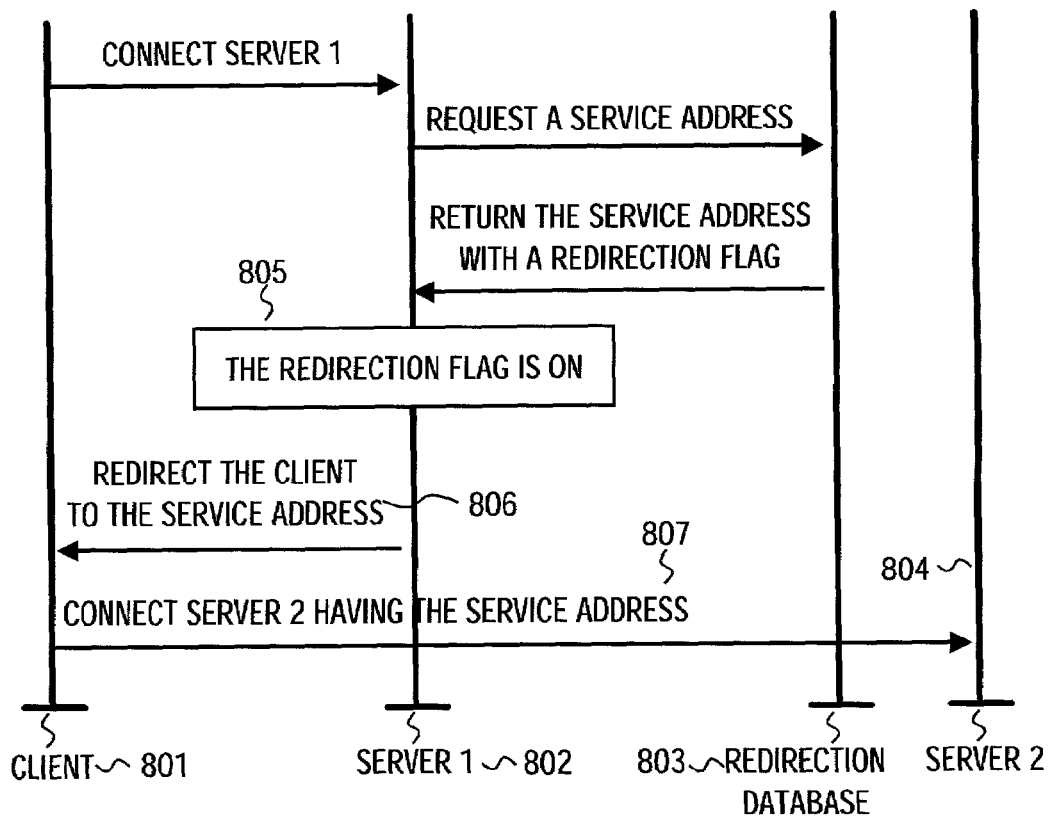
FIG. 8 describes another data flow sequence according to another aspect of the inventive server cluster.
Figure 9:
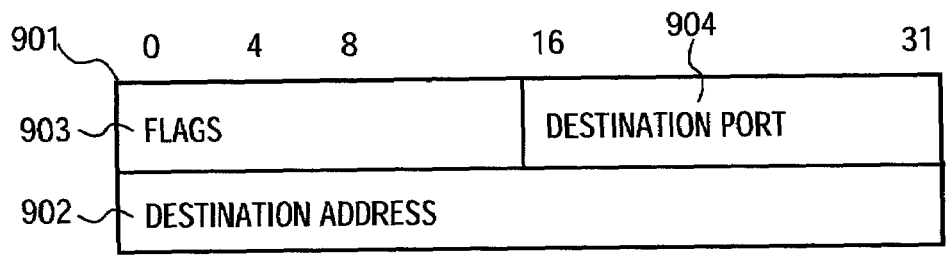
FIG. 9 shows an example of the data structure of a redirection header.

The preferred embodiment of the invention requires the redirection protocol. FIGS. 7, 8, and 9 and the corresponding text describes this new protocol.

FIG. 7 describes a first usage case of a server cluster adapted to operate in accordance with some aspects of the present invention. In this case the client of the server cluster will be served by the same server to which the client initiated the connection. The figure shows the message communication between the client (701), server 1 (702), and the redirection database (703). The client connects to server 1 by sending a packet (704). The packet (704) includes data, an IP header, and either a TCP header or a UDP header. Server 1 receives the packet and requests a service address from the redirection database (705). The service address includes at least an IP address and optionally a port address. In response to the request of server 1, the redirection database returns the service address with a redirection flag (706). Server 1 checks the redirection flag and if it is off, server 1 handles the client's packet and the whole transmission related to it (707). Thus, the client uses the Internet via server 1.

The redirection database may or may not be located at the same site as server 1. The redirection database may also be integrated in server 1 when the communication between server 1 and the redirection database may be based on internal messages. The communication may also be based on a software interface so that server 1 uses the redirection database by calling a subprograms or objects of it. The redirection database is preferably replicated so that if the redirection database information cannot be retrieved from one site, it can be retrieved from another site. Optionally, instead of using a redirection flag, server 1 may compare its own address with the returned service address, and decide if it is the one to service the communication or a redirection is in order.

FIG. 8 describes the second usage case of the server cluster. The figure shows the message communication between the client (801), server 1 (802), the redirection database (803), and server 2 (804). The first three communication messages are the same than in FIG. 7, but this time the redirection flag is asserted (805). Therefore server 1 will not handle the client's packet and the transmission related to it. Instead, server 1 redirects the client to the service address by sending the packet, with a redirection header, back to the client (806). The header includes the service address and redirection flag. The client detects that the redirection flag is on and reads the service address from the header. The service address belongs to e.g. server 2. Therefore the client connects to server 2 by sending a packet (807) and server 2 handles the client's packet and the whole transmission related to it.

If the node pointed to by the service address cannot serve the client, the client may request another redirection by resending the packet to the original or alternative node, with some indication that the node is not responsive. This may be done by adding an indication to the redirection header, or just returning the redirection header with the packet.

FIG. 9 shows an example of the data structure of a redirection header. In this example the redirection header consists of 64 bits so that bits 0–15 are reserved for flags, bits 16–31 are reserved for the destination port, and the rest of bits are reserved for the destination address. In this preferred embodiment, a redirection flag determines whether the client will be redirected or not. Other signalling methods are clear to the one skilled in the art, for example not returning a redirection if no redirection is to take place, or the number of redirection attempts the request went through.

Other optional flags are: a permanent flag, a once flag, and a leased flag. When the permanent flag is on, the client will be permanently serviced by the server indicated by service address. When the once flag is on, the client will be serviced once by the server indicated by the service address, and then either be redirected again or revert to a previous server. When the leased flag is on, the client will be served by the server indicated by the service address as long as a lease is in force. The details related to the flags are discussed later on. Of course, the flags, the destination port, and the destination address could be in other order and the data structure of a redirection header could include additional fields to those mentioned above.

Preferably the redirection is encapsulated within a TCP/IP or a similar well known header, to allow handling of the packet by all commonly available network equipment such as routers and bridges that are responsible for transferring the packet with little care as to its content.

Clearly a client needs to have the capacity to understand and act in accordance with the redirection protocol described above. In the following sending of a packet is termed a "service request", because it starts communication with the redirection database. The client must be adapted to send a service request to a server, and to resend the service request to a second server, responsive to receiving a packet comprising a redirection header. The client obtains the address of the second server from the service address in the redirection header. Preferably, the client is also adapted to store a history of such redirections to be able to react to node failures by informing a server or the redirection database that a redirection failed after a predetermined number of failed attempts. The implementation details of the client are discussed later on.

Notably, the term 'redirection database' should be taken to mean more than just a mere collection of records. The term denoted also the logic that allows the control of such record set, as well as optional decision-making capacity. Thus by way of example the logic that is included in the redirection database may receive information relating to service capabilities of a specific server. Such information may be statically entered or dynamically updated responsive, for example by availability of a specific server. For example, if the logic receives a large number of redirection failures, it may decide that no more redirection should occur to that server for a period of time. The redirection database logic may also determine redirection based on other criteria, such as load balancing, number of hops, and other criteria as desired.

In its most general form, the invention calls for a server operating under this aspect of the invention to inquire the redirection database upon receiving first service requests from clients. The redirection database may return information that instructs the server to take responsibility for serving a request or a group of related requests. Alternatively, the redirection database response may instruct the server to another server, termed the target server, where the request should be directed to. In such case, a redirection header is added to the original service request, which is then sent back to the requesting client. The requesting client redirects the service request to the target server.

Figure 10:
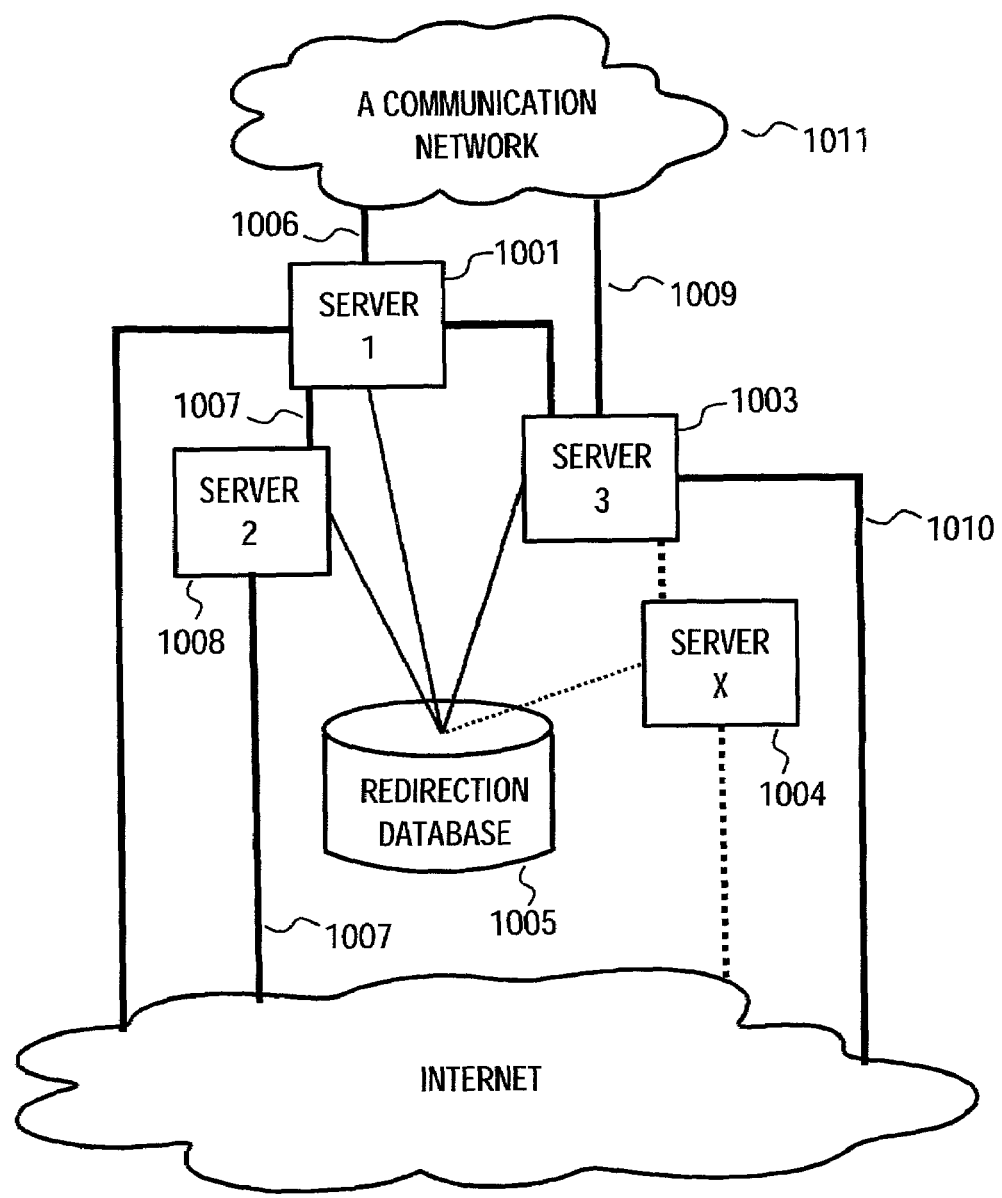
FIG. 10 shows the inventive server cluster with a redirection database in accordance with one aspect of the invention.

FIG. 10 shows a service cluster including server 1 (1001), server 2 (1002), and server 3 (1003). There is also a server X (1004) which could be included in the server cluster. Server X could be, for example, connected to server 3 so that server 3 would redirect some clients to server X. Servers of the server cluster, i.e. servers 1, 2, and 3, are able to retrieve the service address, the redirection flag, and other information from the redirection database (1005). The method for rerouting IP transmissions can be used for rerouting traffic so that rerouting reduces the cost of communications. For example, a route composed of three communication links (1006) (1007) (1008) could be replaced by another route composed of two communication links (1009) (1010). A communication network (1011) may be a wireless network, but it also may be a fixed network. Thus, the server cluster may handle IP transmissions between the Internet and another communication network, or it may handle IP transmissions inside the Internet.

Reducing the cost of communications is one example of how to utilize the method for rerouting IP transmissions. The load balancing of a server cluster is another example of utilizing the method. The load balancing is preferably implemented by collecting certain load information from various servers, and storing this information in the redirection database. The load information can be collected from the servers, for example, once in minute.

FIG. 11 shows an example of the hierarchy of a server cluster. When clients (1101) (1102) communicate at the very first time with a server cluster, they connect to the highest master node of the server cluster (1103). After that they can connect to the other nodes of the server cluster depending on the flags which they receive from the highest master node. In addition to the highest master node, the server cluster may contain two groups of nodes. The first group is composed of a master node for business-users (1104), company server 1 (1105), and company server 2 (1106). The second group is composed of a master node for standard-users (1107), server 1 (1108), server 2 (1109), and server 3 (1110). A client receives the flags and service address in the redirection header of a packet. Lets suppose that the client is "client 1" (1101) and the service address is the IP address of the master node for business-users, i.e. "master node B" (1104). As mentioned above, the possible malfunction of a node is one reason why the redirection is performed more than once. However, the redirection may also be performed because of the hierarchical structure of a server cluster. For example, master node B (1104) may redirect client 1 (1101) to company server 2 (1106). If the permanent flag is on, client 1 will be permanently served by company server 2. If the once flag is on, client 1 will be served once by company server 2 after which client 1 will connect again to master node B. If the leased flag is on, the client will be served by company server 2 as long as the lease is valid, for example, one day. As shown in the figure, a client can communicate with the node of a server cluster via NAT equipment (1111), or directly, as client 2 (1102) does. Internet services used by clients may be located at various Internet sites. The Internet sites are omitted in the figure. However, the Internet services may be located in the nodes of a server cluster. The Internet service is any service available via the Internet.

When NAT equipment performs a mapping for TCP transmissions, the mapping concerns the source address and destination address placed in the IP header of a packet, and the source port and destination port placed in the TCP header of the packet. Correspondingly, when NAT equipment performs a mapping for UDP transmissions, the mapping concerns the source address and destination address placed in the IP header of a packet, and the source port and destination port placed the UDP header of the packet. Similarly, a server can perform mapping for TCP and UDP transmissions.

Addresses and ports can be denoted as follow: (CA, CP) refers to the address and port of a client, (NA, NP) refers to the address and port of NAT equipment, and (SA, SP) refers to the address and port of a server.

Lets suppose that there is no NAT equipment and a client sends a packet to a server. The packet headers include (CA, CP) and (SA, SP) so that CA is the source address, CP is the source port, SA is the destination address, and SP is the destination port. The server receives the packet with (CA, CP) and (SA, SP). When the server sends its own packet to the client, the packet headers include (SA, SP) and (CA, CP) so that SA is the source address, SP is the source port, CA is the destination address, and CP is the destination port.

Lets then suppose that there is NAT equipment between the client and the server. An IP header and either a TCP header or UDP header is sent with the packet. Now the server will not receive (CA, CP). Instead, the NAT equipment replaces (CA, CP) with (NA, NP) and the server receives the packet with (NA, NP) and (SA, SP). When the server sends its own packet to the client, the packet headers include (SA, SP) and (NA, NP). The NAT equipment replaces (NA, NP) with (CA, CP), and thus the client receives the packet with (SA, SP) and (CA, CP).

The NAT equipment is able to perform replacement because it maps (CA, CP) to (NA, NP) and (NA, NP) to (SA, SP). Thus, there might be two mappings: 1) (CA, CP) is mapped to (NA, NP) and 2) (NA, NP) is mapped to (SA, SP). Sometimes, NAT equipment includes only one IP address. Then NA can be omitted and the mappings are 1) (CA, CP) is mapped to NP and 2) NP is mapped to (SA, SP).

Therefore a mapping record preferably includes fields for CA, CP, NP, SA, and SP. Mapping records are placed in the mapping table of the NAT equipment. It is important that the mapping record includes fields for SA and SP, because then the NAT equipment can check whether the source address and source port are such that a client has earlier sent a packet to the same address and port. If that is the case, there is a high probability that the client and the server are in a session. Otherwise, the sender may be e.g. a hacker. To compose an artificial session for UDP transmission in accordance with an aspect of the present invention, a time field is added to the mapping record.

FIG. 12 shows an example of the content of a mapping table which includes N mapping records with time fields. The mapping table is intended to be used in a NAT equipment. The session begins when the NAT equipment receives a packet with a CA, CP, SA, and SP set that is not already mapped. The NAT equipment allocates its free NP for the session and stores a mapping record with CA, CP, NP, SA, SP, and the current time in the mapping table. Thus, the time field is set the current time. Since the mapping record is added to the mapping table and the NAT equipment receives a packet from the client or a packet from the server which match the added mapping record, the NAT equipment resets the current time to the time field of said record. For example, the mapping record with values CA2, CP2, NA2, SA2, SP2 could be such mapping record (1201). Periodically, for example, every three minutes, the NAT equipment passes through the mapping table and checks the time gap between the current time and the time the record was last updated. If the time gap is larger than a preset or a computed value, e.g. three minutes, the NAT equipment determines that the session has terminated and removes the mapping record from the mapping table.

FIG. 13 shows an example of the content of a mapping table which includes M mapping records with time fields. The mapping table is intended for a server belonging to a server cluster. The session begins when the server receives via NAT equipment a packet with such NA, NP, SA, and SP that there is no mapping record having the same NA, NP, SA, and SP. The server stores a mapping record with NA, NP, SA, SP, and the current time in the mapping table. The time fields of mapping records are updated as described above. Also determining the end of a session and deleting the corresponding mapping record is performed as described above. It should be noticed that several NAT equipment and several server clusters are incorporated into the Internet. Thus, the mapping records shown in FIG. 12 does not have to relate to the mapping records shown in FIG. 13. For example, a mapping record (1301) could be such mapping record.

When each server of a server cluster has a mapping table and the artificial UDP session, the method for rerouting IP transmissions can collect UDP session information from the servers of the server cluster and determine UDP load of each server. Because TCP and UDP are in practice the protocols which are in mostly used on the transport layer of OSI model, the total load of each server can be estimated by counting the number of TCP sessions and UDP sessions. For example, the load balancing, or controlling the usage of communication link, can be based on the total loads of servers.

A client capable of using the redirection protocol (termed 'redirecting client') may indicate to the server that capability by using a specific combination of flags. By way of example, the fragment offset bits defined in a TCP header are rarely used in a first request, and may be used for a specific combination indicating capability for redirection.

Figure 14:
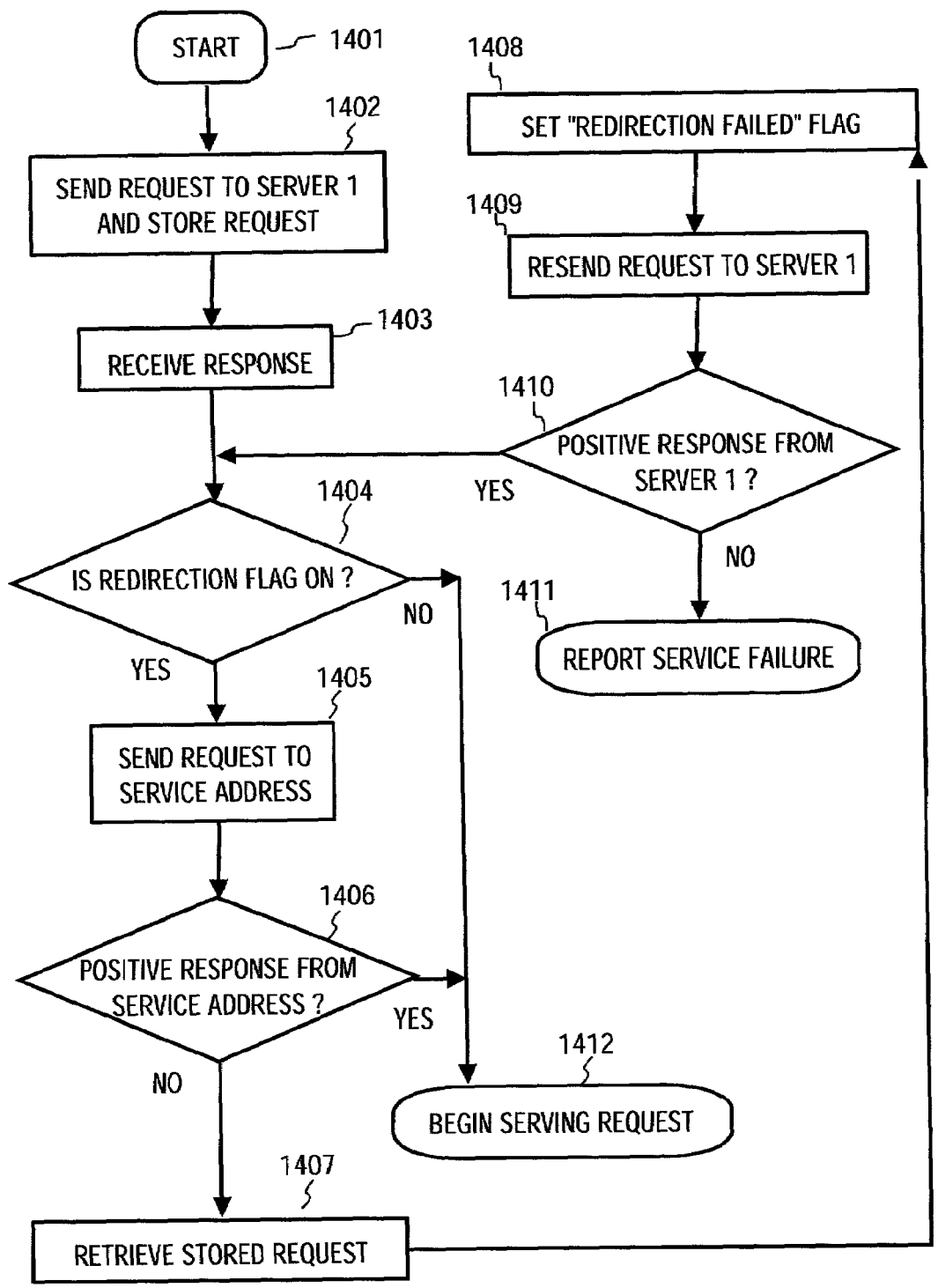
FIG. 14 depicts an example flow diagram of a client operable in accordance with the present invention.

FIG. 14 represents an example flow diagram of a client capable of handling redirection. A service request begins (1401) by sending a service request (1402) to an initial server, termed 'server 1' in the figure, and believed to be capable of handling the request. The client also stores the request (1402). If the request is not answered, the service request fails or alternative initial server is sought (this step is not shown as it is common in the art). Upon receipt of a response (1403) the client determines if the initial server indicated redirection (1404). If no redirection is ordered, the client keeps sending the communications pertinent to the service request to server 1 which handles the request (1412). If redirection is indicated, the client sends the request, preferably with an indication that redirection was ordered, to the target server indicated by the service address (1405). If the target server responds positively (1406), the target server handles the request (1412). If a negative response is received, or a timeout occurs, the client retrieves the stored request (1407), and sets an indication in the request, implying that the redirection failed (1408). The service request is now resent to server 1 (1409). If the client now receives a positive response (1410), the next step is again determining whether redirection is ordered (1404), or if a negative response is received, the client reports to the user that a service failure has happened.

What is claimed is:

1. A method for rerouting network traffic, operating in conjunction with a server cluster comprising at least a first and a second server each having a unique internet address associated therewith, the method comprising the steps of:
   receiving a packet in the first server, the packet being addressed to the first server, and containing indication of a source address associated with a client;
   obtaining a service address and flags from a redirection database, at least one of the flags being a redirection flag,
   when the redirection flag is asserted, adding a redirection header to the packet, the redirection header including a service address, to which the packet is to be redirected to;
   the flags further comprising at least one flag selected from: a permanent flag indicating whether the client is expected to perform the redirection permanently to the service address, a once flag indicating whether the client is expected to perform the redirection once to the service address, or a leased flag indicating whether the client is expected to perform the redirection to the service address as long as a lease is in force; and,
   transmitting the packet and redirection header back to the source address;
   wherein the service address is the address of the second server.

2. The method of claim 1, wherein the source address and the service address are composed of an Internet address and a port.

3. The method of claim 1 further comprising the step of receiving, by
   a server in the cluster, an indication of redirection failure; and,
   providing a second redirection header to the packet, the redirection header including a service address belonging to an alternative third server.

4. The method of claim 1 further comprising the steps of: for each server of the server cluster
   responsive to transmission of a UDP packet, creating and storing a record comprising information identifying the sender address and sender port, and recipient address and recipient port of the UDP packet, and information reflecting the time of transmission;
   responsive to additional transmission of UDP packet from same sender address and port to same recipient address and port, updating said time information to reflect the time of said additional transmission;
   periodically checking for said time information; and,
   removing said record if a predetermined period elapsed from said time of transmission to the time of said checking.

5. The method of claim 4 further comprising the steps of:
   composing an artificial UDP session related to each record comprising information identifying the sender address,
   counting periodically artificial UDP sessions resulting in the number of UDP sessions,
   counting or obtaining TCP sessions resulting in the number of UDP sessions,
   obtaining the total load of each server of the server cluster as a function of the UDP sessions and TCP sessions.

6. The method of claim 5 further comprising the steps of:
   using the total load of each server when performing the load balancing of the server cluster.

7. The method of claim 5 further comprising the steps of:
   using the total load of each server when controlling the usage of the communication links used by the server cluster.

8. The method of claim 1, wherein said redirection database further collects information regarding load on a selected server set, and wherein said information is used as criteria for selecting second server.

9. A method for redirecting network traffic comprising the steps of:
   receiving a service request in a first member server of a cluster server, said request having indication of the request sender;
   selecting a second member server of the cluster server for servicing the service request; and,
   sending to said sender, a redirection indication to said second server, said redirection indication comprising a redirection header having at least one redirection flag.

10. A server cluster having a plurality of member servers each having a distinct internet address, and adapted to reroute network traffic between at least two member servers, the cluster comprising:
    a redirection database adapted to receive information indicative of a client request, and responsively provide a service address comprising an address of a member server capable of servicing said client request, and at least one flag, the flag selected from: a permanent flag indicating whether the client is expected to perform the redirection permanently to the service address, a once flag indicating whether the client is expected to perform the redirection once to the service address, or a leased flag indicating whether the client is expected to perform the redirection to the service address as long as a lease is in force; and, a receiving server adapted to receive said client request and send information indicative thereof to said database;

a transmitting server adapted to send said service address and at least one flag to the client that originating the request.

11. The server cluster of claim 10 wherein the redirection database is integrated in said transmitting server or receiving server or a server combining both.

12. The server cluster of claim 10 wherein the target server is selected according to criteria comprising consideration of server load of a plurality of servers in the cluster.

13. The server cluster of claim 10, wherein a plurality of said member servers are adapted to act as said receiving server.

14. A redirecting client adapted for network traffic rerouting, said client comprising:

a first module adapted to send a service request to a first server; and, a second module to resend the service request to a second server, responsive to receiving a communication packet comprising the service request and a redirection header attached thereto, the redirection header having a service address containing the address of said second server, or an indication thereof;

wherein said first server and said second server belong to a server cluster.

15. The client of claim 14 further comprising a module adapted to resend said service request to said first server, responsive to service failure of said second server;

wherein said resent service request contains indication of said service failure.

16. The client of claim 14, wherein said second module is further adapted to direct subsequent communications relating to said service request to said second server.

17. The client of claim 14 further adapted to send consequent service requests to said second server responsive to indication of doing so embedded within said redirection header.

18. The client of claim 14 wherein said first module is further adapted to indicate a redirecting capacity in said service request.

19. The client of claim 18 wherein said indication of redirecting capacity is indicated in a manner that allows a server lacking redirection capability to service said service request.

* * * * *